United States Patent [19]

Aaronson

[11] 4,407,981
[45] Oct. 4, 1983

[54] FLAME RETARDANT MIXTURE FOR POLYURETHANES

[75] Inventor: Alan M. Aaronson, Fresh Meadows, N.Y.

[73] Assignee: Stauffer Chemical Company, Westport, Conn.

[21] Appl. No.: 349,138

[22] Filed: Feb. 16, 1982

Related U.S. Application Data

[63] Continuation of Ser. No. 217,967, Dec. 19, 1980, abandoned.

[51] Int. Cl.$^3$ .................................................. C08G 18/14
[52] U.S. Cl. ................................. 521/107; 521/108; 521/109; 521/116; 521/117; 521/132; 521/165; 521/168; 521/171; 521/906; 524/130; 524/710; 528/49; 528/51; 528/53; 528/72; 528/85
[58] Field of Search ............... 521/107, 108, 109, 116, 521/117, 132, 165, 168, 171, 906; 528/49, 51, 53, 72, 85; 524/130, 710

[56] References Cited

U.S. PATENT DOCUMENTS

| | | | |
|---|---|---|---|
| 3,424,701 | 1/1969 | Kujawa | 521/906 |
| 3,429,837 | 2/1969 | Langrish et al. | 521/116 |
| 3,515,565 | 6/1970 | Wood et al. | 106/77 |
| 3,582,510 | 6/1971 | Cannelongo | 106/18.19 |
| 3,684,753 | 8/1972 | Franke et al. | 521/116 |
| 3,826,762 | 7/1974 | Treadwell | 521/103 |
| 3,933,693 | 1/1976 | Priest et al. | 521/914 |
| 3,997,449 | 12/1976 | Wilkinson | 521/906 |
| 4,025,470 | 5/1977 | Andres et al. | 521/108 |
| 4,194,068 | 3/1980 | Miller et al. | 521/108 |
| 4,202,779 | 5/1980 | Smith et al. | 521/165 |

*Primary Examiner*—Maurice J. Welsh
*Attorney, Agent, or Firm*—Roger S. Benjamin

[57] ABSTRACT

A composition comprises polyurethane, a two-component flame retardant system consisting of an additive first flame retardant containing organophosphorus, and a second flame retardant containing organochlorine or organobromine.

The composition of the invention may be employed for polyurethane foams, especially rigid foams.

Diminished combustibility for rigid foam is measured by a flame-spread index less than 75 and a smoke developed index less than 450 when subjected to ASTM Test E-84, Surface Burning Characteristics of Building Materials.

Dimethyl methylphosphonate is a representative additive organophosphorus first flame retardant. Trichloroisopropyl alcohol is a representative second flame retardant containing organochlorine.

10 Claims, No Drawings

FLAME RETARDANT MIXTURE FOR POLYURETHANES

This is a continuation of application Ser. No. 217,967, filed Dec. 19, 1980, now abandoned.

BACKGROUND OF THE INVENTION

This invention relates to flame retardant compositions. More particularly it relates to flame retardants for polyurethane compositions especially rigid foams.

Polyurethanes are employed for example as rigid foams in commercial and residential buildings, as flexible foams in mattresses and furniture upholstery, and as coatings on wood furniture and flooring. To protect lives and property flame retardants are used to minimize combustion in polyurethane products alone or increasingly in combination.

Among the individual flame retardants for polyurethane products are alumina and other oxides as flame retardants and fillers, antimony compounds, both inorganic and organic halogen compounds particularly those containing chlorine and bromine, and compounds of phosphorus both organic and inorganic.

Increasingly, it has become attractive to experiment with employing combinations of flame retardants. This is particularly so for the combination of organophosphorus and organohalogen compounds in both rigid and flexible foams of polyurethanes.

In U.S. Pat. No. 4,194,068 Miller et al disclose a tripartite liquid flame retardant composition for cellular polyurethanes consisting of a bromohydrin or pentaerythritol, a polyhydric alcohol, and a sufficient amount of a flame retardant organophosphorus compound to render the mixture liquid at 25° C.

In U.S. Pat. No. 4,025,470 Andres et al disclose a tripartite flame retardant composition for rigid polyurethane foams comprising an alcohol or polyol, a lactam and a phosphorus containing acid or ester. In the Andres patent rigid polyurethane foams are prepared from polyols and polyisocyanates. At column 3, line 67 it is disclosed in passing that the polyol may be substituted by halogen atoms.

In U.S. Pat. No. 3,826,762 Treadwell discloses a tripartite flame retardant system for polyurethane foams comprising an inert non-porous filler, a halogen source, and a phosphorus containing compound, almost invariably inorganic. In this disclosure the inert inorganic non-porous filler is coated with a mixture of the source of halogen and the phosphorus containing compound.

Thermoplastic polymers such as vinyl polymers, nylons, cellulosic resins, and polycarbonates may be protected by a synergistic mixture of a chlorinated hydrocarbon and a phosphinic acid according to the disclosure in U.S. Pat. No. 3,582,510.

Cellulose acetate laboratory specimens are rendered self-extinguishing when subjected to an Underwriters Laboratories burning test (UL 94) by inclusion of a plasticizing mixture of a trialkyl phosphate and an organic bromine compound, as disclosed in U.S. Pat. No. 3,515,565.

A principal object of this invention is to minimize the combustibility of polyurethane products by use of two flame retardants one containing halogen and the other containing phosphorus both flame retardants being organic in nature.

An additional object of the invention is to produce rigid polyurethane foams with reduced combustibility by the criterion of the ASTM E84 Surface Burning of Materials Test.

A further object of the invention is to provide a rigid polyurethane foam with low smoke density as measured by the ASTM E84 Smoke Density Test.

Still a further object of the invention is to provide more flexibility to the formulator of polyurethane products by providing separate sources of flame retardants containing organophosphorus and organochlorine or organobromine so that the phosphorus/halogen ratio may be varied.

Other objects of the invention will be apparent to those skilled in the art by inspection of the disclosure and Examples which follow.

SUMMARY OF THE INVENTION

Unexpectedly, I have discovered that a combination of two flame retardants for polyurethanes, one containing organophosphorus, the other containing organohalogen such as chlorine or bromine is more efficacious for minimizing combustion than either alone. A first flame retardant composition containing organophosphorus is added to the polyurethane formulation. A separate second flame retardant composition containing organic halogen may either be added to the polyurethane formulation or may be a chemically-bonded constitutent such as a halogenated polyol or a halogenated isocyanate. A phosphonate ester such as diethyl ethylphosphonate typifies the organic phosphorus composition. The halogen containing second flame retardant is exemplified by an additive compound such as trichloroisopropyl alcohol. Halogen may be incorporated into the polyurethane by use of reactive compositions such as ω-trichloroethyl substituted ethylene oxide as the polyol.

In measuring the efficacy of the flame retardant mixture the ASTM Test E84 Surface Burning Characteristics of Building Materials is employed to measure both the flame spread index and the smoke density rating.

DESCRIPTION OF THE INVENTION

Diminished combustibility is an important and sought-after property of materials especially for building components and consumer items. The complex nature of flame retardants is illustrated by the wide variety of characteristics measured by various tests among which are: ease of ignition, flame intensity, time of flame spread, rate of flame spread, ignition time, burning time, rate of burning, char length, afterflame, afterglow, area of flame spread, burn length, flash point, flash ignition temperature, smoke density, critical radiant flux, flame projection, percent light absorption, oxygen index, and specific optical density. For building materials, among which are rigid polyurethane foams, a stringent and important test is the "Steiner Tunnel Test". The roof of a 7.62 m (25-foot) standard fire test chamber is lined with the building material to be tested and its "Surface Burning" characteristics are determined by measuring its flame-spread index and smoke density. This test is known variously as American Society of Testing Materials (ASTM)E84-77; Underwriters' Laboratories 723, National Fire Protection Association 255, or Uniform Building Code Standard 42-1.

Polyurethane foams are widely used in the building, transportation, appliance, furniture, packaging, textile, and carpet industries both in rigid and flexible versions. In all these applications flame retardance is an important property. In the past flame retardance in polyurethane foams has been achieved by physically adding various chemicals to the foam formulation uncombined or chemically bonding them into the reactive intermediates which become the foam by covalent bonds. Among the additive flame retardants for polyurethane foams are antimony oxide, zinc oxide, ferric oxide, cupric oxide, titanium oxide, alumina, ferrocene, inert fillers such as barium sulfate or calcium carbonate, organic compounds of phosphorus, organic compounds containing chlorine, organic compounds containing bromine, organophosphorus compounds containing chlorine or bromine, or halides of antimony, tin, and titanium, as well as polymeric organic fillers containing nitrile groups. Among the reactive combined flame retardants are phosphorus-containing polyols, phosphorus-halogen polyols, halogen-containing polyols, and halogenated isocyanates.

The present invention is an improved flame-retarded polyurethane composition employing a mixture of two flame retardants: the first, an additive organophosphorus compounds; the second an organic compound containing halogen either additive or combined. The improved properties of the polyurethane are demonstrated by the Steiner Tunnel Test.

Additive flame retardants containing organophosphorus inhibit flame spread erratically, as shown in Comparative Example 1. Characteristically halogenated reactive intermediates, which participate in the polymerization reaction, confer char stability and are comparatively less efficient than phosphorus compounds in retarding flame spread, as observed in the Steiner Tunnel Test and shown in Examples 2, 4, and 8. Employing two flame retardants, one containing organophosphorus—the other organohalogen, realizes the advantages of both types as shown in Examples 3, 5, 9, and 14. The flame-spread is controlled monotonically plus char stability is added by the organohalogen. Additionally, utilizing two different flame retardants enables the polyurethane producer to have more adaptability and versatility in formulating different ratios of phosphorus and halogen than if he used a halogenated organophosphorus compound such as tris-dibromopropyl phosphate. In the practice of this invention it is necessary to have a two-component system of flame retardants with separate sources of organophosphorus and organochlorine or organobromine and to employ them both.

Polyurethane foams are made by condensing polyols and polyisocyanates often in the presence of a foaming agent. The polyols are usually hydroxy-terminated polyethers or polyesters. If the polyols are difunctional and isocyanates are difunctional, then flexible foams result. If the polyols have tri- or higher functionality, crosslinked, rigid foams are produced. The gas necessary to cause the mixture to foam may be carbon dioxide, formed by the reaction of water with the diisocyanate, or an inert low-boiling additive such as fluorocarbon 11B, fluorotrichloromethane. The condensation reaction and foam generation are catalyzed and facilitated by the addition of small amounts of catalysts, emulsifiers, and stabilizers. Amine catalysts, tin catalysts, and silicone oils are common adjuvents.

Polyols useful in making polyurethanes are for example: poly(oxytetramethylene)glycol, 1,1,1-trimethylolpropane, glycerol, poly(oxypropylene)glycols, poly(oxyethylene)glycols, poly(oxypropylene-b-oxyethylene)glycols, 1,2,6-hexanetriol, sorbitol, sucrose adducts, lactose adducts, mannitol adducts, pentaerythritol and its adducts, and polyesters prepared from adipic acid or phthalic anhydride plus ethylene glycol, propylene glycol, 1,3- and 1,4-butylene glycol, diethylene glycol, 1,2,6-hexanetriol, trimethylolpropane, or 1,1,1-trimethylolethane.

Exemplary polyisocyanates employed in the production of polyurethanes are: 2,4-tolylene diisocyanate, 4,4'-diphenylmethane diisocyanate, dianisidine diisocyanate, tolidine diisocyanate, m-xylylene diisocyanate, and hexamethylene diisocyanate.

The reaction of the isocyanate group with the alcohol group is catalyzed by compounds such as triethylene diamine, tertiary amines, pyrones, lactams, and organic heavy metal compounds among which are organic compounds of bismuth, lead, tin, iron, antimony, zinc, cobalt, and aluminum soluble in the reactants necessary for preparing urethanes. The reaction of water with an isocyanate to form carbon dioxide as the blowing agent is catalyzed by triethylenediamine, tertiary amines and tin compounds such as tin carboxylates.

Emulsifiers and surface-active agents promote intimate mixing of the components for the foam, insuring uniformity of cell size. Mineral oils are used to increase cell size and reduce shrinkage. Silicone copolymer oils are useful in providing resilience to the walls of the flexible foams. Information on the preparation of polyurethane products is available in "Urethane Polymers" by Pigott, in the second edition of the Kirk-Othmer Encyclopedia of Chemical Technology, 21, 56–106, Wiley (1970).

The additive organic compound containing phosphorus employed as the first flame retardant in the present invention is admixed with the monomeric components before polycondensation occurs. The amount of the organophosphorus first flame retardant is calculated to provide from about 0.2 to about 4 percent by weight phosphorus in the final composition; from about 0.25 to about 1.8 percent phosphorus by weight is preferred. Among the suitable organic phosphorus flame retardants of the additive type are alkyl acid phosphates such as methyl or butyl acid phosphate, trialkyl phosphates such as triethyl phosphate, dimethyl methyl phosphate, diethyl ethylphosphonate, oligomeric phosphate esters based on ethylene glycol diphosphate, oligomeric cyclic phosphonate such as ANTIBLAZE®19, a cyclic condensation product of 1,1,1-trimethylolpropane and dimethyl methylphosphonate, oligomeric phenylphosphonates, triarylphosphates especially liquid mixtures, aminophosphorus compounds such as diethyl N,N-bis (2-hydroxyethyl)-aminomethylphosphonate(-FYROL®6) or phosphonitrilics, phosphine oxides and dialkyl or diaryl phosphinic acids.

The halogen-containing organic compound, the second flame retardant used in the present invention, can be the additive type or be a reactive monomer in the polycondensation. If the halogen is chlorine, the amount in the final foam ranges from about 0.5 to about 25 percent by weight with the preferred range being from about 1 to about 10 percent by weight. If the halogen is bromine, the weight percent used in the final foam ranges from about 0.5 to about 15 percent with the preferred range from about 1 to about 8 weight percent.

Some additive chlorine flame retardants are hexachlorocyclopentadiene and its Diels-Alder adducts, hexachlorobenzene, esters and imides of tetrachlorophthalic anhydride, dichloroxylenes, tetrachloroxylenes, chlorinated biphenyl, chlorinated paraffin oils and waxes, and chlorinated naphthalenes.

Representative additive bromine flame retardants are brominated xylene, brominated diphenyl ethers, esters and imides of tetrabromophthalic anhydride, brominated paraffin waxes and brominated biphenyls.

Exemplary chlorinated alcohols which are suitable as reactive intermediates in the polycondensation reaction to form polyurethanes are: trichloropropanol, the Diels-Alder adduct of hexachlorcyclopentadiene and castor oil, polyepichlorohydrin, 4,4,4,-trichloro-1,2-epoxy butane alone or condensed with sucrose, the reaction product of tetrachloroxylylene dihalides with polyols, reaction products of hexachlorobutandiene, chlorendic acid, or hexachlorobenzene with polyols, and the terpolymer of vinyl chloride, hydroxyethyl vinyl ether, and fumarate esters. Some brominated reactive alcohols are: dibromocyclooctanediol, dibromoneopentyl glycol, the brominated polyol formed by the reaction of allyl propylene oxide ether and propylene oxide with glycerol, the 2,3-dibromopropyl ether of sorbitol, polyols reacted with tetrabromophthalic anhydride or hydroxydiesters of tetrabromophthalic anhydride, brominated bisphenols and their derivatives, glycol diesters of brominated allylsuccinic anhydride, brominated castor oil, and tribromo- or pentabromophenol.

Test specimens of polyurethanes can be in various forms among which are slabs cut from a poured "bun" of foam or boards with polyurethane coating or foams which have been sprayed on them. For surface burning characteristics ASTM E-84-77 is a suitable test, the procedure for which is incorporated herein by reference (American Society for Testing Materials, Philadelphia, 1977 Part 18, pp 690–705). For this surface burning test the specimens are 47 cm wide, 7.32 m long (in sections) and five cm thick. The roof of the test tunnel is lined with the specimen to be tested, which is flamed for 10 minutes by gas burners. As described in detail in the cited text for the test, the temperature, the flame spread distance, and a photoelectric cell reading are recorded. The specimen being tested is given a calculated numerical rating of flame spread and fuel contribution, between the arbitrary standard of 0(asbestos-cement board) and 100(select grade red oak flooring). Smoke developed ratings are calculated from the readings of the photoelectric cell.

Polyurethane compositions other than foams can be made into useful articles by conventional molding, casting, laminating, and coating techniques.

Other tests for flame retardancy and smoke generation can be administered such as Oxygen Index (ASTM D-2863), NBS Smoke Density (ASTM STP 422), Butler Chimney Test (ASTM 3016), or Building Materials Test (DIN 4102-B2).

The invention is illustrated but not limited by the following Examples.

COMPARATIVE EXAMPLE 1

This Comparative Example illustrates the irregular effects resulting from use of only an additive flame retardant containing organophosphorus in a polyurethane foam based on a sucrose amine type of polyol.

A rigid polyurethane foam composition including dimethyl methylphosphonate (Stauffer Chemical Co. FYROL®DMMP) was prepared from two components labeled A and B, as follows:

| | Grams |
|---|---|
| Component A | |
| MONDUR MR (Mobay Co.) polymeric isocyanate | 18,386 |
| Fluorocarbon 11B - fluorotrichloromethane | 1,614 |
| Component B | |
| MULTRANOL 4034 (Mobay Co.) sucrose amine polyol | 11,168 |
| MULTRANOL 4050 (Mobay Co.) crosslinking sucrose amine polyol | 2,893 |
| FYROL ® DMMP (Stauffer Co.) | Variable |
| Fluorocarbon 11B | 4,386 |
| POLYCAT 8 (Abbott Co.) dimethyl cyclohexyl amine | 595 |
| THERMOLITE T-12 (M and T Chemical Co.) dibutyl tin dilaurate | 63 |
| DC-193 (Dow Corning Co.) silicone oil | 200 |

The foams were layed down by conventional spray application utilizing a Gusmer Model FF proportioner and Model D spray gun onto precut asbestos-cement boards, oversprayed to a thickness in excess of 5 cm. The samples for the tunnel test were cut to 5 cm thickness by means of a horizontal band saw. The foam densities were about 32 kg/m$^3$.

Different polyurethane foam samples containing 0, 2, 2.5, 3, 4, 5, 6, and 7 percent by weight FYROL ®DMMP flame retardant (percent P 0, 0.5, 0.625, 0.75, 1.0, 1.25, 1.50, 1.75) were subjected to the Steiner Tunnel Test according to the procedure of ASTM E84-77 (Part 18 pp. 690–705). The test results are shown in Table 1.

TABLE 1

| % P in foam | Flame-Spread Distance (m) | Flame-Spread Index | Smoke Developed Rating |
|---|---|---|---|
| 0 | 6.1 | 1725/1580 | 350 |
| 0.5 | 4.2 | 70/80 | 375 |
| 0.625 | 4.8 | 75/125 | 530 |
| 0.75 | 2.4 | 40/45 | 385 |
| 1.0 | 2.1 | 35/40 | 515 |
| 1.25 | 1.8 | 30/35 | 390 |
| 1.50 | 4.8 | 75/115 | 370 |
| 1.75 | 4.2 | 70/60 | 680 |

The flame spread distance is the total distance traveled by the flame during the test. The first flame spread index is the rating calculated according to the method used in the ASTM E-84 test until 1976. The second flame spread index is the value calculated by the revision of 1977 of that test.

COMPARATIVE EXAMPLE 2

This Comparative Example illustrates the flame retardant effects of a reactive intermediate containing chlorine used alone in a foam based on the sucrose amine type of polyol.

A rigid polyurethane foam similar to the composition of Example 1 was employed except that the flame retardant was THERMOLIN RF 230, a reactive adduct of trichlorobutylene oxide, ethylene glycol, and dextrose (Olin Co.). The procedures for mixing, spraying, and testing were the same as in Example 1. The composition of the foam is given below:

| | Grams |
|---|---|
| Component A | |
| MONDUR MR | 18,236 |

-continued

|  | Grams |
|---|---|
| Fluorocarbon 11B | 1,764 |
| Component B |  |
| MULTRANOL 4034 | 9,580 |
| MULTRANOL 4050 | 2,394 |
| THERMOLIN RF 230 | Variable |
| Fluorocarbon 11B | 3,878 |
| DC 193 | 204 |
| POLYCAT 8 | 408 |
| T-12 | 62 |

The foam density was about 28.8 kg/m$^3$.

Different foam samples containing 7.0, 8.5, and 12 percent by weight THERMOLIN RF 230 (3.3, 4.0, and 6.0 percent by weight Cl) were subjected to the Steiner Tunnel Test according to the procedure of ASTM E-84-77. The test results are shown in Table 2.

TABLE 2

| % Cl in Foam | Flame-Spread Distance (m) | Flame-Spread Index | Smoke Developed Rating |
|---|---|---|---|
| 3.3 | 4.5 | 70/115 | 345 |
| 4.0 | 3.6 | 60/70 | 501 |
| 4.0 | 2.7 | 45/50 | 340 |
| 4.0 | 3.6 | 60/70 | 290 |
| 6.0 | 3.0 | 50/55 | 290 |

EXAMPLE 3

This Example illustrates the synergistic effort of adding two different types of retardant to a polyurethane foam based on polyols of the sucrose amine type compared to the results of Comparative Examples 1 and 2. The first flame retardant is a phosphorus-containing additive type (of Example 1); the second flame retardant is a reactive polyol containing chlorine (of Example 2).

Polyurethane foam components A and B employing the same reagents, catalysts, and surface active agents as in the previous Examples were formulated containing FYROL ®DMMP dimethyl methylphosphonate as the flame retardant containing organophosphorus (1,2,3 wt. percent) and THERMOLIN RF 230 as the source of organic chlorine (6.4, 4.3, 2.1 wt. percent). After spray application to asbestos-cement boards using the same equipment and procedures as in the previous Examples, the Steiner Tunnel Test was performed with the results shown in Table 3.

TABLE 3

| Wt. % P in foam | Wt. % Cl in foam | Foam Density (kg/m$^3$) | Flame-Spread Distance (m) | Flame-Spread Index | Smoke Developed Rating |
|---|---|---|---|---|---|
| 0.25 | 3.0 | 39 | 2.7 | 45/50 | 525 |
| 0.50 | 2.0 | 35.5 | 2.1 | 35/40 | 440 |
| 0.75 | 1.0 | 41.8 | 2.1 | 35/40 | 450 |

COMPARATIVE EXAMPLE 4

Foam compositions of the sucrose amine type similar to those of Example 2 were formulated employing as a flame retardant in Component B a polyol based on an adduct of lactose with epichlorohydrin. The flame retardant of differing purity was incorporated at levels of 9.1, 11.3, 12.1, and 12.8 weight percent of the flame retardant corresponding to 3,4,4, and 4 weight percent chlorine in the foams. The foam density was about 34.9 kg/m$^3$. The foams were subjected to the Steiner Tunnel Test. The results of this test are shown in Table 4.

TABLE 4

| % Cl in Foam | Flame-Spread Distance (m) | Flame-Spread Index | Smoke Developed Rating |
|---|---|---|---|
| 3 | 2.7 | 45/50 | 360 |
| 4 | 3.1 | 50/55 | 305 |
| 4 | 2.6 | 40/45 | 450 |
| 4 | 3.9 | 60/70 | 345 |

EXAMPLE 5

This Example also illustrates the synergistic effect of employing two flame retardants; one containing organophosphorus, the other containing combined organic chlorine in foams based on polyols of the sucrose amine type.

As in the previous Examples polyurethane foams were formulated, and sprayed onto test boards for the Steiner Tunnel Test. One foam contained 1.45 weight percent FYROL ®DMMP dimethyl methylphosphonate and 7.06 weight percent of a polyol based on the reaction of lactose with epichlorohydrin. The other foam contained 2.0 weight percent FYROL ®DMMP dimethyl methylphosphonate and 6.0 percent by weight of the chlorinated lactose adduct. Test boards were characterized by the Steiner Tunnel Test with the following results:

| Wt. % P in Foam | Wt. % Cl in Foam | Foam Density (kg/m$^3$) | Flame-Spread Distance (m) | Flame-Spread Index | Smoke Developed Rating |
|---|---|---|---|---|---|
| 0.36 | 2.1 | 33 | 2.3 | 40/45 | 415 |
| 0.50 | 2.0 | 29.3 | 2.1 | 35/40 | 450 |

COMPARATIVE EXAMPLE 6

This Comparative Example illustrates the results of adding various levels of an organophosphorus flame retardant to a rigid foam of the sucrose amine type but different from that of the previous Examples.

Urethane compositions were prepared based on the following formulation:

| Component | % by Weight |
|---|---|
| THANOL R480 (Jefferson Chemical Co.) a sucrose-based aminopolyol | 34.72 |
| Fluorocarbon 11B | 16.0 |
| DC 193 silicone oil | 0.5 |
| POLYCAT 8 dimethylcyclohexyl amine | 1.0 |
| THERMOLITE T-12 dibutyl tin dilaurate | 0.15 |
| FYROL ® DMMP dimethyl methylphosphonate | Variable |
| MONDUR MR polymeric isocyanate (mixed separately) | 47.63 |

Each of the formulations was sprayed onto asbestos-cement board in a single pass with a Model D Gusmer gun and Model FF proportioner to a thickness greater than five cm and then scarfed to a five-cm thickness.

The same compositions were mixed and poured into box frames 67 cm wide and 267 cm long allowing the foam to rise freely. The components were mixed for 15–30 seconds in a 20-liter container with a Model PS Jiffy Mixer. After several days of curing the buns were cut into five-cm boards for testing.

The Steiner Tunnel Test was used to evaluate the polyurethane foams with the results shown in Table 6.

TABLE 6

| Wt. % FYROL® DMMP | Wt. % P in Foam | Type | Foam Density (kg/m³) | Flame-Spread Index | Initial Flame Spread-Distance (m) | Smoke Developed Rating |
|---|---|---|---|---|---|---|
| 0 | 0 | Spray | 37 | 1650/1640 | 6.0 | 360 |
| 0.5 | 0.125 | Pour | 34.2 | 75/145 | 4.8 | 390 |
| 1.0 | 0.25 | Pour | 34.6 | 60/70 | 3.7 | 305 |
| 1.5 | 0.375 | Pour | 34.4 | 50/55 | 3.1 | 315 |
| 2.0 | 0.5 | Pour | 31.8 | 45/50 | 2.7 | 340 |
| 2.0 | 0.5 | Spray | 30.6 | 35/40 | 2.1 | 345 |
| 4.0 | 1.0 | Spray | 25.8 | 35/40 | 2.1 | 455 |

COMPARATIVE EXAMPLE 7

This Comparative Example illustrates the use of the same combined flame retardant containing chlorine as in Example 2 but in the foam based on the type of sucrose amine polyol shown in Comparative Example 6.

A foam ws made as in Comparative Example 6, but instead of the organophosphorus flame retardant of Comparative Example 6, 8.5 weight percent of Thermolin RF 230 was used so that the foam contained 4.0 weight percent chlorine.

When the Steiner Tunnel test was administered the results were flame indexes of 70/115 and a smoke developed rating of 335. Without any flame retardant the control foam has a flame spread index of 1650/1640 and a smoke developed rating of 360.

COMPARATIVE EXAMPLE 8

This Comparative Example shows the effects of using dibromoneopentyl glycol (Dow Co. FR-1138) alone as a flame retardant.

In the same type of foam based on a polyol of the sucrose amine type, as found in Comparative Example 1, 6.6 weight percent FR-1138 (Dow) dibrominated glycol was added into the formulation. After employing the Steiner Tunnel Test to characterize the flame retardant properties of this foam the results were flame-spread index of 45/50 and a smoke developed rating of 320.

EXAMPLE 9

This Example illustrates the synergism of the present invention employing in the formulation a sucrose-amine based polyol, a first additive flame retardant containing organophosphorus, as in Comparative Example 6, plus the reactive organic compound containing chlorine as in Comparative Example 7, or bromine as the second flame retardant, as in Comparative Example 8.

Polyurethane foam compositions were formulated, mixed, and sprayed onto boards as in Example 6 based on the following formulation:

| Component | Wt. % |
|---|---|
| THANOL R-480 (Jefferson Chemical Co.) sucrose-amine polyol | 28.9 |
| FYROL® DMMP (Stauffer Chemical Co.) dimethyl methylphosphonate, 1.25 wgt. % P | 5.0 |
| DC-193 (Dow Corning Co.) silicone oil | 1.0 |
| Fluorocarbon 11B | 16.0 |
| THERMOLITE T-12 (M and T Chemical) dibutyl tin dilaurate | 0.02 |
| MONDUR MR (Mobay Co.) polyisocyanate | 44.3 |

| Component | Wt. % |
|---|---|
| (mixed separately) plus one of the following reactive compounds containing halogen | 5.0 |
| THERMOLIN RF-230 (Olin Co.) chlorinated butylene epoxide, 3 wgt. % Cl | |
| FR-1138 (Dow Co.) dibromoneopentyl glycol, 3 wgt. % Br | |

The density of these foams was 29.4 kg/m³ and the closed cell content of the foams was 86 percent.

After spray application of these foams to asbestos-cement board as in Example 6, the samples were subjected to the Steiner Tunnel Test (ASTM E84-77) with the following results:

| Flame Retardants | Wgt + % P Wgt + % X | Initial Flame-Spread Distance | Flame-Spread Index | Smoke Developed Index |
|---|---|---|---|---|
| DMMP/FR1138 | 1.25/3 | 1.4 | 30/35 | 425 |
| DMMP/THERMOLIN RF230 | 1.25/3 | 2.0 | 25/30 | 315 |

COMPARATIVE EXAMPLE 10

This Example illustrates the effect of a reactive, brominated compound as the sole flame retardant on the combustibility of a rigid polyurethane foam formulated with an amino aromatic polyol, THANOL R350X (Jefferson Chemical Co.).

Rigid polyurethane foam containing THANOL R350X, an amino aromatic polyol from the Jefferson Co. formulated, mixed and sprayed onto boards as in Example 7. The formulation was:

| Component | Wgt. % |
|---|---|
| THANOL R350X polyol | 29.17 |
| DC-193 (Dow Corning) silicone oil | 0.5 |
| POLYCAT-8 (Abbott) dimethylcyclohexyl amine | 0.2 |
| THERMOLITE T-12 (M and T) dibutyl tin dilaurate | 0.15 |
| Fluorocarbon 11B (Pennwalt) | 16.0 |
| MONDUR MR (Mobay) polyisocyanate (mixed separately) | 46.98 |
| FR-1138 (Dow) dibromoneopentyl glycol | Variable |

The density of these rigid foams was about 32 kg/m³. The closed cell content was about 94 percent.

When subjected to the Steiner Tunnel Test, the results were as shown in Table 10.

TABLE 10

| Wt. % FR1138 | Wt. % Br | Initial Flame-Spread Distance (m) | Total F-S Distance (m) | Flame-Spread Index | Smoke Developed Index |
|---|---|---|---|---|---|
| None | — | 2.4 | 6 | 625/575 | 530 |
| 5% | 3% | 2.0 | 2.7 | 45/45 | 400 |
| 6.7% | 4% | 2.0 | 4.2 | 70/70 | 455 |
| 6.7%, but 4% | | 2.0 | 3.5 | 60/65 | 445 |

THANOL R650X
a polyol with higher functionality than R350X.

COMPARATIVE EXAMPLE 11

This Comparative Example illustrates the use of an organophosphorus flame retardant alone in a rigid foam based on an amino aromatic polyol, THANOL R350X (Jefferson), as in Example 10.

The same formulation and procedures were used as in Comparative Example 1 except that THANOL R350X was the polyol. After administration of ASTM E 84-77 (Steiner Tunnel Test), the results were:

| % FYROL ® by wt. | % P by wgt. | Flame-Spread Index | Smoke Developed Rating |
|---|---|---|---|
| 0 | 0 | 625/575 | 530 |
| 3 | 0.75 | 675/— | 790 |
| 6 | 1.5 | 510/440 | 960 |

COMPARATIVE EXAMPLE 12

This Comparative Example illustrates the use of an organic flame retardant containing phosphorus in a rigid foam based on a mixture of a sucrose polyol and an aromatic amine polyol.

The general formulation and procedures of Comparative Example 1 were used except that two polyols were used on a 1:1 weight basis Reichhold Chemical Co. (White Plains, N.Y.) POLYLITE 34408, an aromatic amine and POLYLITE 98326 a modified sucrose polyol, also Reichhold. The results of the tunnel test were as follows:

| % FYROL ® DMMP by wgt. | % P by wgt. | Flame-Spread Index | Smoke Developed Rating |
|---|---|---|---|
| 0 | 0 | 75/145 | 485 |
| 1 | 0.25 | 550/700* | 470 |
| 2 | 0.5 | 430/460* | 700 |

*integrity of the char destroyed.

EXAMPLE 13

This Example illustrates the improvements derived from the present invention by showing the effect of a mixture of flame retardants so formulated that the resultant rigid polyurethane foam contained 0.25 percent phosphorus, and 1.2 percent bromine, both by weight. Comparative Examples 8 and 12 should be compared to foam 13X; Comparative Examples 10 and 11 should be compared to foam 13Y. The two foams were formulated as follows:

|  | 13X | Weight Percent 13Y |
|---|---|---|
| THANOL R350X polyol | 16.57 | 33.27 |
| THANOL R480X polyol | 16.57 | None |
| FR1138 dibromoneopentyl glycol (60% Br) | 2.0 | 2.0 |
| FYROL ® DMMP dimethyl methylphosphonate (25% P) | 1.0 | 1.0 |
| DC-193 silicone oil | 0.5 | 0.5 |
| T-12 dibutyl tin dilaurate | 0.15 | 0.15 |
| Polycat-8 dimethylcyclohexylamine | 0.30 | None |
| Fluorocarbon 11B | 15.0 | 15.0 |
| MONDUR MR polyisocyanate (mixed separately) | 47.9 | 48.08 |
| Foam density, kg/m³ | 36.6 | 35.7 |
| Closed cell content, percent | 93.9 | 94.4 |

The formulations were mixed, spray applied, foamed, and tested in the Steiner Tunnel Test as in the previous Examples with the following results:

|  | Initial Flame-Spread Distance (m) | Flame-Spread Index | Smoke Developed Index |
|---|---|---|---|
| Foam 13X | 2.7 | 70/90 | 385 |
| Foam 13Y | 1.8 | 70/60 | 465 |

Having described the present invention and illustrated it in terms which are representative but not limiting, the scope of legal protection sought is given by the claims below.

I claim:

1. A flame-retarded polyurethane composition comprising polyurethane, a two-component flame retardant system consisting of an additive first flame retardant containing dialkyl alkylphosphonate and a second flame retardant containing organochlorine or organobromine incorporated in a polyether polyol.

2. The composition of claim 1 wherein the amount of phosphorus is between about 0.2 to about 4 percent by weight.

3. The composition of claim 1 wherein the amount of chlorine is between about 0.5 to about 25 percent by weight.

4. The composition of claim 1 wherein the amount of bromine is between about 0.5 to about 15 percent by weight.

5. The composition of claim 1 in the form of foam.

6. The composition of claim 1 in the form of a rigid foam.

7. The composition of claim 1 wherein the first flame retardant is selected from the group consisting of diethyl ethylphosphate, dimethyl methylphosphonate, and diethyl methylphosphonate.

8. The composition of claim 1 wherein the second flame retardant is selected from the group consisting of trichloroisopropyl alcohol and dibromoneopentyl glycol.

9. A polyurethane foam composition having a flame spread index less than 75 and a smoke developed index less than 450 when subjected to ASTM Test E-84, Surface Burning Characteristics of Building Materials, comprising polyurethane, a two-component flame retardant system consisting essentially of an additive first flame retardant containing dialkyl alkylphosphonate, and a second flame retardant containing or organochlorine or organobromine incorporated in a polyether polyol.

10. A process for making a polyurethane foam comprising foaming a mixture of a polyol, a polyisocyanate, a first flame retardant containing dialkyl alkylphosphonate, and a second flame retardant containing organochlorine or organobromine in a polyether polyol.

* * * * *

UNITED STATES PATENT AND TRADEMARK OFFICE
CERTIFICATE OF CORRECTION

PATENT NO. : 4,407,981
DATED : October 4, 1983
INVENTOR(S) : Alan M. Aaronson

It is certified that error appears in the above—identified patent and that said Letters Patent is hereby corrected as shown below:

Column 7, line 31, "effort" should be -- effect --.

Claim 7, line 3 of the claim, "ethylphosphate" should be -- ethylphosphonate --.

Claim 9, line 8 of the claim, "or" shoud be -- an --.

Signed and Sealed this

Twentieth Day of March 1984

[SEAL]

Attest:

GERALD J. MOSSINGHOFF

*Attesting Officer*    *Commissioner of Patents and Trademarks*